(12) United States Patent
Hernandez

(10) Patent No.: US 8,960,574 B2
(45) Date of Patent: Feb. 24, 2015

(54) HITCH BAR WITH SWIVEL

(76) Inventor: Harvey Hernandez, Corpus Christi, TX (US)

(*) Notice: Subject to any disclaimer, the term of this patent is extended or adjusted under 35 U.S.C. 154(b) by 449 days.

(21) Appl. No.: 13/457,220

(22) Filed: Apr. 26, 2012

(65) Prior Publication Data

US 2013/0284832 A1 Oct. 31, 2013

(51) Int. Cl.
| E01C 19/20 | (2006.01) |
| H01R 33/00 | (2006.01) |
| B60R 9/00 | (2006.01) |
| B60R 11/00 | (2006.01) |
| B60R 9/06 | (2006.01) |

(52) U.S. Cl.
CPC .. *B60R 9/06* (2013.01); *E01C 19/20* (2013.01)
USPC ........... 239/650; 239/651; 239/653; 239/661; 239/663; 439/35; 224/495; 224/497; 224/502; 224/509; 224/519

(58) Field of Classification Search
USPC .......... 239/172, 650–653, 661, 663; 224/495, 224/497, 502, 509, 519; 439/35
See application file for complete search history.

(56) References Cited

U.S. PATENT DOCUMENTS

| 4,971,234 A | * | 11/1990 | Hay | 224/42.32 |
| 5,094,373 A | * | 3/1992 | Lovci | 224/509 |
| 5,375,773 A | * | 12/1994 | Lewis | 239/650 |
| 5,845,832 A | * | 12/1998 | Eichmann | 224/509 |
| 5,950,617 A | * | 9/1999 | Lorenz | 126/276 |
| 5,988,534 A | * | 11/1999 | Kost et al. | 239/650 |
| 6,089,478 A |  | 7/2000 | Truan et al. |  |
| 6,701,913 B1 |  | 3/2004 | LeDuc et al. |  |
| 6,715,703 B2 |  | 4/2004 | Kost et al. |  |
| 6,752,328 B2 |  | 6/2004 | Sauls |  |
| 7,347,390 B2 |  | 3/2008 | Truan et al. |  |
| 7,404,376 B2 |  | 7/2008 | Hernandez |  |
| 7,431,227 B2 | * | 10/2008 | Gamble et al. | 239/651 |
| 7,591,404 B2 | * | 9/2009 | LeDuc et al. | 224/509 |
| 2004/0079774 A1 | * | 4/2004 | Roehmer et al. | 224/42.21 |
| 2005/0077327 A1 | * | 4/2005 | Kenney | 224/42.21 |
| 2006/0180680 A1 |  | 8/2006 | Gamble, II et al. |  |
| 2011/0220742 A1 |  | 9/2011 | Sandler |  |
| 2011/0253758 A1 | * | 10/2011 | Bertrand | 224/519 |
| 2012/0305612 A1 | * | 12/2012 | Bell, Jr. | 224/519 |

FOREIGN PATENT DOCUMENTS

EP 163353 12/1985

* cited by examiner

*Primary Examiner* — Len Tran
*Assistant Examiner* — Thomas Berez
(74) *Attorney, Agent, or Firm* — Richard C Litman

(57) ABSTRACT

The hitch bar with swivel has a proximal portion that attaches removably to the conventional receiver hitch receptacle of a supporting vehicle and a distal portion for supporting an apparatus, e.g., spreader for distributing animal feed, etc., thereon. The distal bar portion is positioned to overlay the proximal portion and to place the supported apparatus close to the rear of the supporting vehicle during operations in order to reduce the lever arm and corresponding bending loads on the hitch receptacle. The distal portion of the bar may be swiveled clear of the rear of the vehicle to allow the rear door (tailgate, rear hatch, etc.) of the vehicle to be opened when the vehicle is stopped. The distal bar portion and apparatus supported thereon have a combined length preferably less than half the width of the vehicle, permitting the bar to be swiveled freely without extending laterally beyond the vehicle.

5 Claims, 4 Drawing Sheets

HITCH BAR WITH SWIVEL

BACKGROUND OF THE INVENTION

1. Field of the Invention

The present invention relates to vehicle hitches and towing attachments, and particularly to a hitch bar with swivel that allows the object attached thereto (e.g., spreader, etc.) to be pivoted clear of the rear of the supporting vehicle for access thereto.

2. Description of the Related Art

Innumerable devices have been adapted for removable attachment to the rear of a motor vehicle by means of the common receiver hitch receptacle often provided on such vehicles. Among these devices is an apparatus known as a spreader that serves to distribute or broadcast various materials therefrom. These materials may range from fertilizer to grass or other seed to animal feed, and perhaps other materials as well.

Spreaders are generally provided with relatively large capacity hoppers in order to avoid the need for frequent refilling of the hopper during operations. The resulting weight can place a considerable strain on the vehicle attachment means. As a result, many larger spreader and hopper units are permanently attached to the rear of the supporting vehicle, or at least attached by structure other than or in addition to the standard receiver hitch receptacle. Where a receiver hitch bar is used, it is desired to position the spreader (or other apparatus supported by the bar) as close as practicable to the supporting vehicle in order to reduce the length of the lever arm defined by the bar extending from the vehicle and its receiver hitch receptacle. The extension of a relatively massive structure from the receiver hitch receptacle of the vehicle can produce considerable bending forces on the hitch structure, particularly as the structure is accelerated up and down in the vertical plane through short, rapid movements due to the vehicle traveling over uneven terrain. The shorter the supporting hitch bar (lever arm), the smaller these bending forces are.

However, the close proximity of the spreader (or other apparatus) to the rear of the vehicle blocks the opening of the rearward door of the vehicle (e.g., pickup tailgate, rear door of van, etc.). If the operator needs to access some article or component within the rear of the vehicle, he or she must first remove the hitch-supported apparatus from the rear of the vehicle. As the apparatus may have a weight exceeding that which the operator is capable of supporting manually, the operator must find some means of supporting the hitch supported apparatus for removal, or disassemble the apparatus into manageable components, or drive the vehicle to a location where suitable supports (hoists, etc.) are available, just to open the rear gate or door of the vehicle.

Thus, a hitch bar with swivel solving the aforementioned problems is desired.

SUMMARY OF THE INVENTION

The hitch bar with swivel is adapted for removable installation to the standard or conventional receiver hitch receptacle of a motor vehicle. The hitch bar has two sections, including a first or proximal section to the vehicle that is immovably affixed in the receiver hitch receptacle during installation, and a second or distal section supporting an apparatus, such as a spreader, animal feed distributor (feeder), etc. The two sections are secured to one another by a swivel having a substantially vertical axis when the hitch bar is mounted to the supporting vehicle.

The hitch bar is swiveled to position the spreader, feeder, or other apparatus close to the supporting vehicle during operation of the vehicle and/or spreader. This reduces the length of the lever arm extending from the rear of the vehicle, thus correspondingly reducing the force applied to the structure at the rear of the vehicle through the receiver hitch receptacle. When the operator wishes to access the rear of the vehicle, he or she need only swivel the distal section of the hitch bar generally 180° from its operative position to move the supported spreader or other apparatus well clear of the rear of the vehicle. The operator may then open the pickup tailgate, rear door or hatch, etc. of the supporting vehicle to access the interior of the vehicle. When the access to the rear of the vehicle is completed, the tailgate, door, hatch, etc. is closed and the distal portion of the hitch bar assembly is swiveled back into its normal operating position for operation or transport of the apparatus supported thereon.

The distal arm portion of the hitch bar has a length preferably less than half the width of the supporting vehicle. As the proximal arm portion is substantially in the vertical plane of the longitudinal centerline of the supporting vehicle, the distal arm portion of the hitch bar and the apparatus supported thereon cannot extend beyond the side of the vehicle at any point in its arcuate travel, thus allowing the supporting vehicle to be parked in a relatively narrow or tight area while still allowing the swivel arm and attachment to be swiveled clear of the rear of the vehicle for access thereto.

The structure of the hitch bar and swivel joint is preferably formed of readily available materials, such as square section steel tubes for the arms and concentric pipe sections for the swivel, but other materials may be adapted. Means for supporting an electrical cable may be provided along and/or through the arm portions and/or swivel to provide electrical power to the apparatus being carried on the hitch bar. A hitch pin is provided to secure the distal bar portion to the proximal bar portion to hold the apparatus supported on the distal bar close to the supporting vehicle for operations. The pin is temporarily removed to allow the distal portion of the bar to swivel freely when rear door or tailgate access is needed.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The hitch bar with swivel provides for the placement of the distal end of the bar relatively close to the supporting vehicle during operation, thereby reducing the length of the lever arm and corresponding bending loads on the attachment point to the vehicle while the vehicle is in motion. The swivel allows the distal portion of the bar, i.e., the portion carrying the operative apparatus (spreader, etc.), to be pivoted away from the rear of the vehicle when not in operation to allow the operator to open the rear door or gate of the vehicle for access to the inside of the vehicle without having to remove the apparatus and/or hitch bar from the vehicle.

Figure 1:
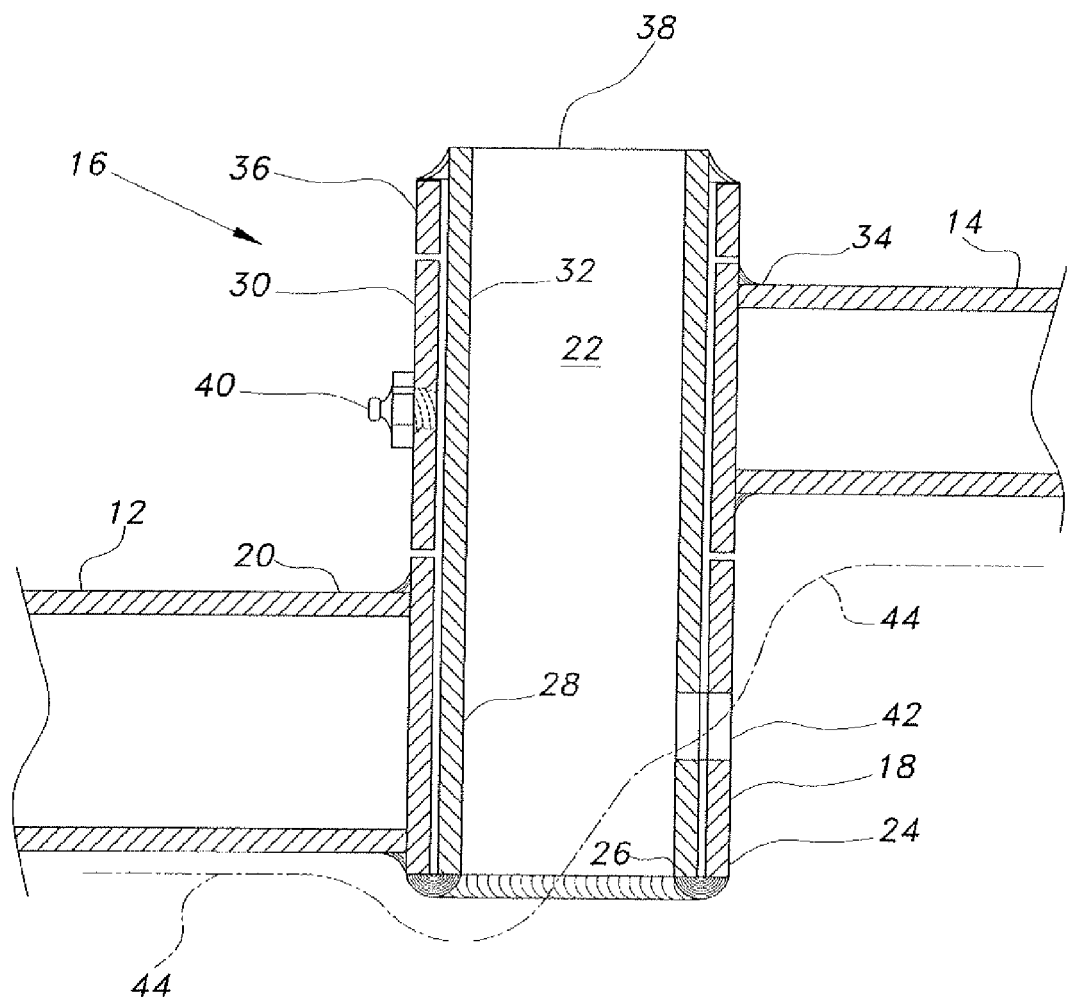
FIG. 1 is a partial side elevation view in section of a hitch bar with swivel according to the present invention, illustrating various details thereof.

FIG. 1 of the drawings provides a detailed side elevation view in section of the swivel mechanism of the hitch bar with swivel, designated generally by the reference numeral 10 in the drawings. The bar of the hitch bar with swivel comprises a hitch attachment arm 12, also designated as the proximal arm, that is removably attachable to the supporting vehicle, and a swivel arm 14, also designated as the distal arm, attached to the hitch attachment arm 12 by a swivel mechanism 16.

The swivel mechanism 16 includes a cylindrical lower collar 18, to which the swivel attachment end 20 of the hitch attachment arm 12 is welded so that the hitch attachment arm 12 extends radially from the lower collar 18. A hollow, cylindrical support sleeve 22 is installed concentrically within the lower collar 18. The lower end 24 of the lower collar 18 is welded to the lower end 26 of the support sleeve 22. The lower collar 18 thus concentrically surrounds the lower portion 28 of the support sleeve 22, the assembly of the lower collar 18 and support sleeve 22 being open at the lower end thereof. Thus, the hitch attachment arm 12, lower collar 18, and support sleeve 22 are permanently and immovably affixed to one another, and do not swivel or pivot relative to one another or relative to the supporting vehicle when installed thereto.

A swivel collar 30 is placed concentrically about the upper portion 32 of the support sleeve 22 above the lower collar 18 and rests thereon. The swivel collar 30 is not immovably attached to the support sleeve 22 or to the lower collar 18, but is free to rotate or swivel about the upper portion 32 of the support sleeve 22. The attachment end 34 of the distal or swivel arm 14 is welded to the swivel collar 30 and extends radially therefrom. An upper collar 36 is welded to the upper end 38 of the support sleeve 22, thereby capturing the swivel collar 30 about the upper portion 32 of the support sleeve 22 between the fixed lower collar 18 and the fixed upper collar 36. A grease fitting 40 is threaded into the medial portion of the swivel collar 30 diametrically opposite the swivel arm 14 to provide lubrication between the swivel collar 30 and the support sleeve 22. The lower collar 18 and the lower portion 28 of the support sleeve 22 may have a passage 42 formed therethrough diametrically opposite the hitch attachment arm 12 for an electrical wiring harness or cable 44 from the support vehicle to the apparatus (spreader, etc.) supported by the distal swivel arm 14 of the hitch bar and swivel. A grommet or the like (not shown) may be installed in the passage 42 to protect the wiring 44 from chafing.

Figure 2:
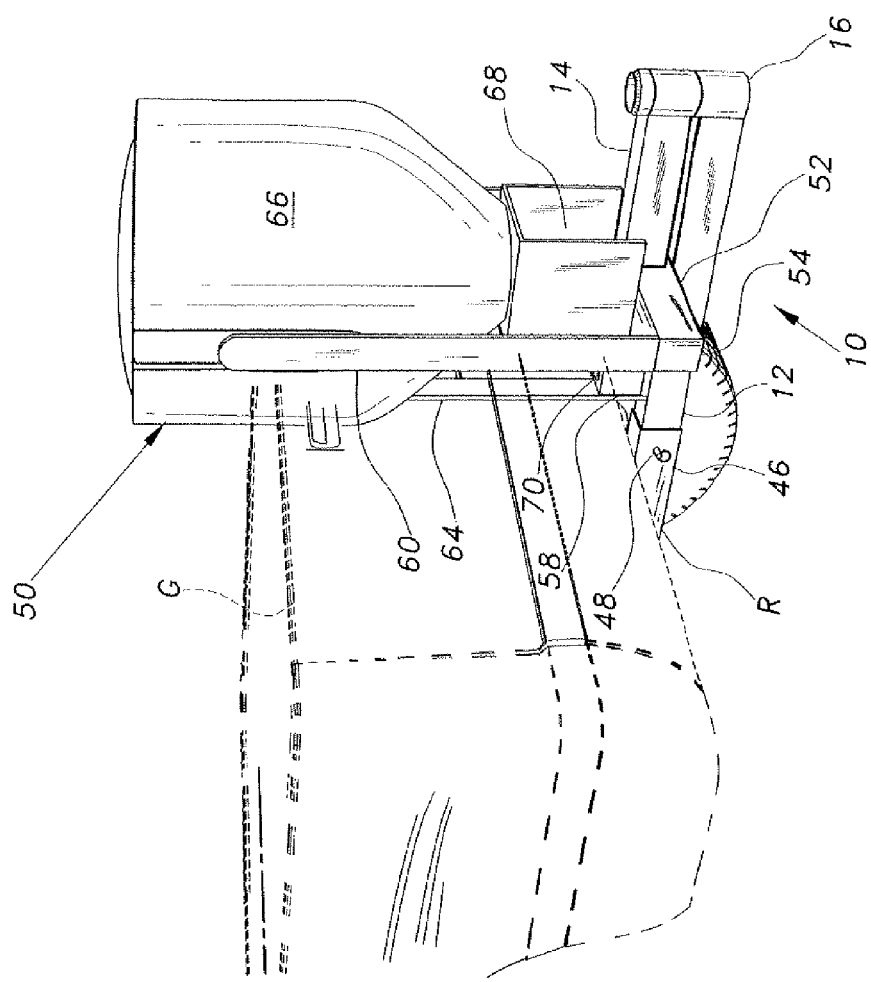
FIG. 2 is an environmental perspective view of the hitch bar with swivel of FIG. 1, shown attached to the rear of a supporting vehicle, the hitch bar supporting a spreader apparatus in its operable position adjacent to the rear of the vehicle.
Figure 3:
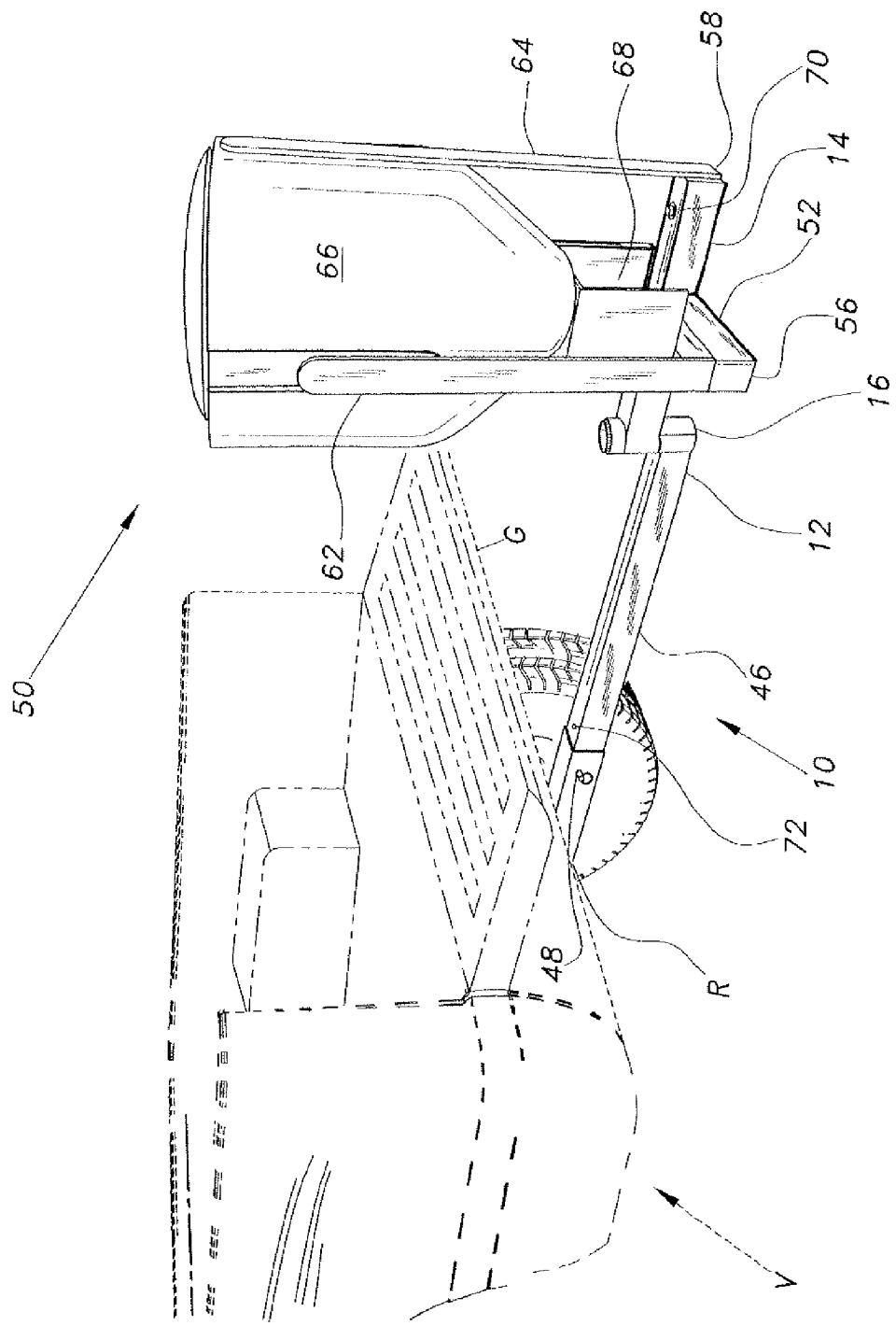
FIG. 3 is an environmental perspective view of the hitch bar with swivel of FIGS. 1 and 2, shown attached to the rear of a supporting vehicle, the spreader apparatus being shown pivoted clear of the rear of the vehicle for access to the rear of the vehicle.

FIGS. 2 and 3 of the drawings provide environmental perspective views of the hitch bar with swivel 10 installed to the receiver hitch receptacle R of a supporting vehicle V, e.g., a pickup truck, etc. The hitch attachment arm 12 is preferably formed of an elongate, straight length of square section steel tubing, the hitch attachment end 46 having a dimension adapted to fit closely within the receiver hitch receptacle R of the supporting vehicle V. A conventional hitch pin 48 is used to secure the hitch attachment arm 12 to the receiver hitch receptacle R.

The swivel arm 14 also comprises an elongate, straight length of material, preferably square or rectangular section steel tubing. The swivel arm 14 is adapted for supporting a spreader assembly 50 or other attachment thereon. A spreader support arm 52 extends laterally across the swivel arm 14. The spreader support arm 52 is also preferably formed of square or rectangular steel tube stock and has mutually opposed first and second ends 54 and 56. The swivel arm 14 has a distal end 58. Vertically disposed first and second hopper supports 60 and 62 extend upward from the first and second ends 54 and 56 of the spreader support arm 52. A third hopper support arm 64 extends vertically upward from the distal end 58 of the swivel arm 14. These three hopper support arms 60 through 64 support the spreader hopper 66 therein. The open side of the arrangement disposed generally above the swivel mechanism 16 provides a clear area for the installation and removal of the hopper 66 to and from the hitch bar and swivel 10. The spreader mechanism 68 is suspended from the lower end or mouth of the hopper 66, above the swivel arm 14 and spreader support arm 52. The spreader mechanism 68 shown in the drawings is one kind of conventional spreader mechanism, but any other conventionally known spreader mechanism may be used.

FIG. 2 of the drawings illustrates the hitch bar and swivel 10 in an operative position, i.e., the swivel arm 14 is rotated to overlie the hitch attachment arm 14. The swivel arm 14 is secured in this position by a swivel arm hitch pin 70 inserted through aligned passages 72 in the swivel arm 14 and the hitch attachment arm 12; the passage 72 through the hitch arm 12 being visible in FIG. 3. The configuration illustrated in FIG. 2 places the spreader assembly 50 quite close to the structure of the supporting vehicle V, thereby reducing the length of the lever arm between the receiver hitch receptacle R and the spreader assembly 50, which may have a load in the hopper 66. Thus, the stress and strain on the receiver hitch structure of the supporting vehicle V and the bending loads on the hitch attachment arm 12 as the vehicle V is in motion and encountering vertical accelerations due to uneven terrain are greatly reduced.

However, the operative configuration illustrated in FIG. 2 results in blocking the vehicle tailgate G or other rearwardly disposed vehicle door. The hitch bar with swivel 10 facilitates opening the vehicle rear door or tailgate G by swiveling the swivel arm 14 and spreader assembly 50 through substantially 180° to position the spreader assembly 50 rearward of the swivel mechanism 16. The operator need only remove the swivel arm hitch pin 70 from its passages 72 through the two arms 12 and 14, and swivel the swivel arm 14 away from the rear of the vehicle V. The swivel arm hitch pin 70 may be stored in the corresponding passage 72 through either the swivel arm 14 (as shown in FIG. 3) or the hitch attachment arm 12, as needed. The length of the hitch attachment arm 12 provides clearance between the hopper 66 and the rear of the vehicle V, allowing the tailgate G to be dropped, as shown in FIG. 3.

Figure 4:
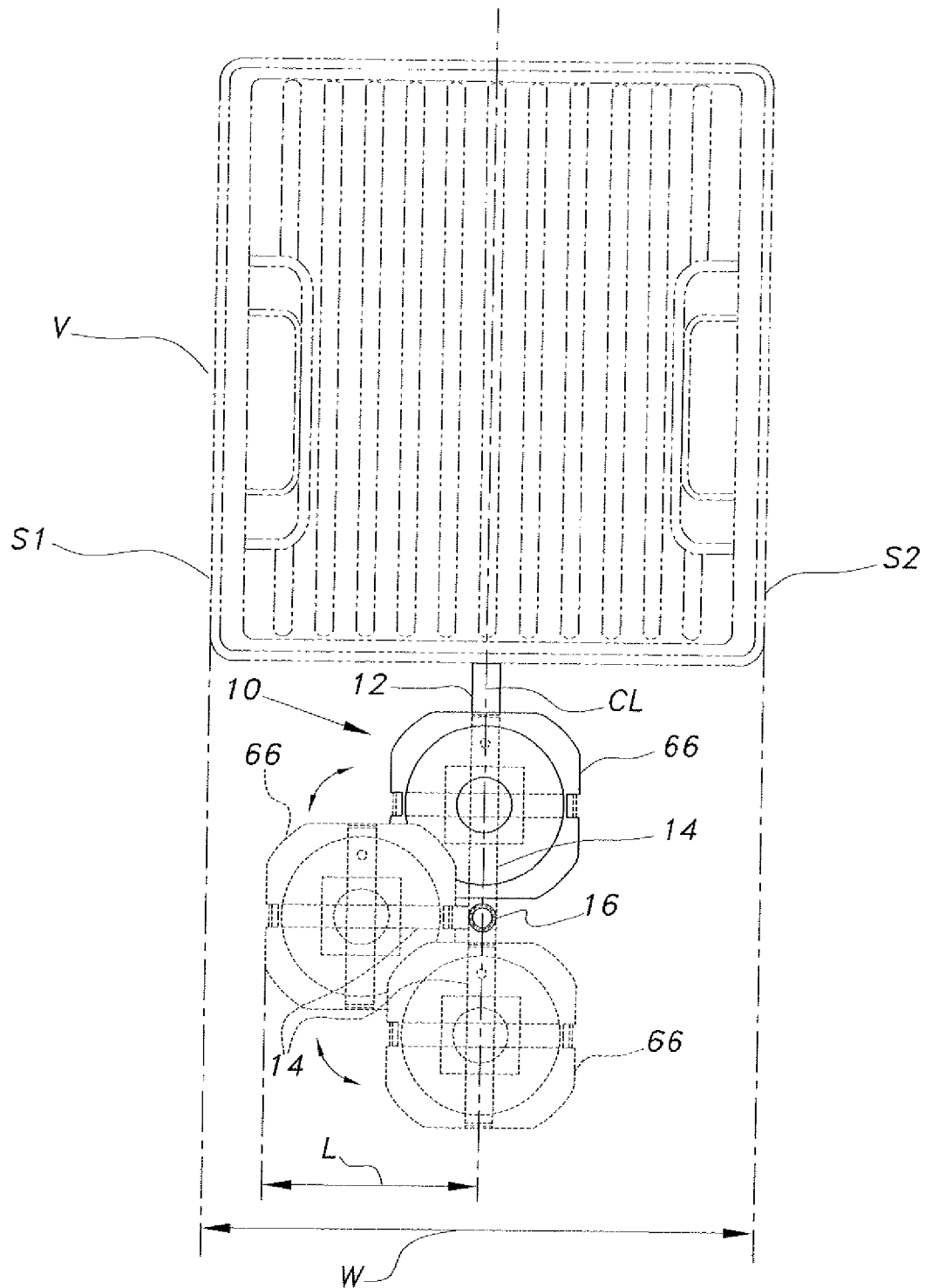
FIG. 4 is a schematic environmental top plan view of the rear of the supporting vehicle with the hitch bar with swivel of FIGS. 1 and 2, shown with the hitch bar and attached spreader in the operative position, the fully extended position, and an intermediate position.

Preferably, the swivel arm 14 has a length less than half the width of the supporting vehicle V, as shown in FIG. 4 of the drawings. In FIG. 4, the hitch bar 12 is shown extending from its removable attachment to the receiver hitch receptacle of the supporting vehicle V. The hitch bar 10 is shown in its operative configuration with the hopper 66 in solid lines and the swivel arm 14 extending forward from the swivel 16 to lie over the hitch attachment arm 12. This positions the spreader mechanism and its hopper 66 quite close to the rear of the vehicle V (e.g., bed of a pickup truck, as shown in FIG. 4), thereby reducing the stresses on the hitch arm 12 and hitch structure of the vehicle V, as noted further above.

When access to the rear of the vehicle V is required, the operator need only remove the swivel arm hitch pin 70 from its installation as shown in the configuration of FIG. 2, and swivel the swivel arm 14 to its extended position substantially in alignment with the centerline CL of the vehicle V. This is the most rearward position shown in FIG. 4, corresponding to the position illustrated in FIG. 3 of the drawings. This positions the spreader mechanism and hopper 66 (shown in broken lines in this position) at its greatest distance from the rear of the vehicle V, allowing the tailgate (or other access panel or door, depending upon the vehicle configuration) to be opened for access.

FIG. 4 also illustrates an intermediate position for the swivel arm 14 and hopper 66 thereon, shown at 90° to the vehicle centerline CL and corresponding axis of the hitch arm 12. It will be seen in the top plan view of FIG. 4 that the swivel arm 14 has a length L that is less than half the width W of the vehicle V, as measured from the centerline CL of the vehicle V. This assures that the distal end of the swivel arm 14 and the apparatus attached thereto, such as the hopper 66, cannot extend beyond the side S1 of the vehicle V, or the opposite side S2 if swiveled or pivoted to the right side. It will be recalled that the position of the hopper 66 on the swivel arm 14 is defined in part by the third hopper support arm 64 that extends vertically upward from the distal end 58 of the swivel arm 14. Thus, the hopper 66 cannot extend beyond the distal end 58 of the swivel arm 14.

Accordingly, the supporting vehicle V may be positioned or parked in a relatively narrow area that provides just sufficient room for the width W of the vehicle, and the swivel arm 14 with its attached hopper 66 may still be swiveled or pivoted through 180° while remaining within the width W of the support vehicle V when swiveled through an arcuate path about the swivel 16. Any structure that may be immediately adjacent to the rearward extended side of the vehicle V, e.g., the rearward extension line of the side S1 of the vehicle, cannot interfere with the full arcuate travel of the swivel arm 14. The operator of the vehicle V with the hitch bar with swivel 10 attached thereto may easily manipulate the swivel arm 14 to provide access to the rear of the vehicle V, even though the vehicle may be parked in a relatively narrow garage or other width restricted or limited parking area. Once this has been accomplished, the operator need only reposition the swivel arm 14 and lock it in place over the hitch arm 12, as shown in FIG. 2, to be ready for operations.

It is to be understood that the present invention is not limited to the embodiments described above, but encompasses any and all embodiments within the scope of the following claims.

I claim:

1. In combination, a towing vehicle and a hitch bar assembly adapted for removable attachment in rear of the towing vehicle, comprising:
   a vehicle having a rearwardly disposed vehicle door or tailgate, the vehicle having a width;
   an elongate, straight hitch attachment arm having a hitch attachment end and a swivel attachment end opposite the hitch attachment end;
   a swivel disposed at the swivel attachment end of the hitch attachment arm;
   an elongate, straight swivel arm having a swivel attachment end attached to the swivel and a distal end opposite the swivel attachment end, the distal end being adapted for supporting a load, the swivel arm having a length, wherein the length is less than half the width of the vehicle, the swivel arm being pivotal between a first position overlying the hitch attachment arm to support the load above the hitch attachment arm and a second position extending substantially 180° opposite the hitch attachment arm to provide access to the rear of the towing vehicle, wherein the swivel arm has a generally medially disposed spreader support portion, the hitch bar assembly further comprising:
   i) a laterally disposed spreader support arm extending across the spreader support portion of the swivel arm, the spreader support arm having mutually opposed first and second ends;
   ii) vertically disposed first and second hopper supports extending from the first and second ends of the spreader support arm, respectively; and
   iii) a vertically disposed third hopper support extending from the distal end of the swivel arm:
   a spreader hopper supported by the hopper supports;
   a spreader mechanism disposed below the hopper and above the swivel arm and spreader support arm;
   a hollow, cylindrical support sleeve having an upper portion, an upper end, a lower portion, and a lower end;
   a lower collar disposed concentrically about the lower portion of the support sleeve, the lower collar having a lower end welded to the lower end of the support sleeve, the swivel attachment end of the hitch attachment arm being welded to the lower collar, the hitch attachment arm extending radially from the lower collar;
   a swivel collar pivotally disposed concentrically about the support sleeve above the lower collar, the swivel attachment end of the swivel arm being welded to the swivel collar, the swivel arm extending radially from the swivel collar, the swivel collar being pivotal 180° around the sleeve; and
   an upper collar welded concentrically about the upper end of the support sleeve, the upper collar and the lower collar capturing the swivel collar therebetween.

2. The hitch bar assembly according to claim 1, wherein the lower collar and the support sleeve have a wiring harness passage disposed therethrough diametrically opposite the hitch attachment arm, the hitch bar assembly further comprising a lubrication fitting disposed in the upper collar opposite the swivel arm.

3. The hitch bar assembly according to claim 1, wherein the hitch attachment arm and the swivel arm each have a hitch pin passage disposed therethrough, the hitch bar assembly further comprising a hitch pin removably disposed through the hitch pin passages of the hitch attachment arm and the swivel arm, whereby the swivel arm is pivotal to lie above the hitch arm and be temporarily locked thereto by the hitch pin.

4. The hitch bar assembly according to claim 1, wherein the hitch attachment arm and the swivel arm are formed of rectangular section steel tubes.

5. A hitch bar assembly adapted for removable attachment in rear of a towing vehicle, comprising:
   an elongate, straight hitch attachment arm having a hitch attachment end and a swivel attachment end opposite the hitch attachment end;
   a swivel disposed at the swivel attachment end of the hitch attachment arm;
   an elongate, straight swivel arm having a swivel attachment end attached to the swivel and a distal end opposite the swivel attachment end, the distal end being adapted for supporting a load, the swivel arm being pivotal between a first position overlying the hitch attachment arm to support the load above the hitch attachment arm and a second position extending substantially 180° opposite the hitch attachment arm to provide access to the rear of the towing vehicle, wherein the swivel arm has a generally medially disposed spreader support portion, the hitch bar assembly further comprising:

i) a laterally disposed spreader support arm extending across the spreader support portion of the swivel arm, the spreader support arm having mutually opposed first and second ends;
   ii) vertically disposed first and second hopper supports extending from the first and second ends of the spreader support arm, respectively; and
   iii) a vertically disposed third hopper support extending from the distal end of the swivel arm;
a spreader hopper supported by the hopper supports;
a spreader mechanism disposed below the hopper and above the swivel arm and spreader support arm;
a hollow, cylindrical support sleeve having an upper portion, an upper end, a lower portion, and a lower end;
a lower collar disposed concentrically about the lower portion of the support sleeve, the lower collar having a lower end welded to the lower end of the support sleeve, the swivel attachment end of the hitch attachment arm being welded to the lower collar, the hitch attachment arm extending radially from the lower collar;
a swivel collar pivotally disposed concentrically about the support sleeve above the lower collar, the swivel attachment end of the swivel arm being welded to the swivel collar, the swivel arm extending radially from the swivel collar, the swivel collar being pivotal 180° around the sleeve; and
an upper collar welded concentrically about the upper end of the support sleeve, the upper collar and the lower collar capturing the swivel collar therebetween.

* * * * *